(12) United States Patent
Jiang et al.

(10) Patent No.: US 11,469,850 B2
(45) Date of Patent: Oct. 11, 2022

(54) METHOD AND DEVICE IN UE AND BASE STATION FOR WIRELESS COMMUNICATION

(71) Applicants: Qi Jiang, Shanghai (CN); Xiaobo Zhang, Shanghai (CN); Lin Yang, Shanghai (CN)

(72) Inventors: Qi Jiang, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 122 days.

(21) Appl. No.: 17/033,997

(22) Filed: Sep. 28, 2020

(65) Prior Publication Data
US 2021/0044379 A1    Feb. 11, 2021

Related U.S. Application Data

(63) Continuation of application No. PCT/CN2019/089055, filed on May 29, 2019.

(30) Foreign Application Priority Data

Jun. 5, 2018    (CN) .......................... 201810568614.8

(51) Int. Cl.
*H04W 4/00* (2018.01)
*H04L 1/00* (2006.01)
(Continued)

(52) U.S. Cl.
CPC .......... *H04L 1/0023* (2013.01); *H04L 1/1812* (2013.01); *H04W 72/04* (2013.01)

(58) Field of Classification Search
CPC ... H04L 1/0023; H04L 1/1812; H04L 1/1822; H04L 1/1835; H04L 1/00; H04W 72/04
See application file for complete search history.

(56) References Cited

U.S. PATENT DOCUMENTS

2008/0104119 A1* 5/2008 Cho ........................ G06F 16/58
707/999.102
2009/0315767 A1* 12/2009 Scalisi ..................... G01S 19/34
342/357.74

(Continued)

FOREIGN PATENT DOCUMENTS

CN    103078721 A     5/2013
WO    2017135044 A1   8/2017

OTHER PUBLICATIONS

ISR in application PCT/CN2019/089055 dated Jul. 11, 2019.
(Continued)

*Primary Examiner* — Atique Ahmed

(57) ABSTRACT

The disclosure provides a method and a device in a User Equipment (UE) and a base station for wireless communication. The UE receives a first signaling and a first radio signal, and transmits first information; only X1 bit(s) in a first bit block is(are) used for generating the first radio signal, the first bit block is obtained as an output of channel coding of a first code block; the first signaling is used for determining that the X1 bit(s) cannot be used for decoding of the first code block with combining when channel decoding for the X1 bit(s) fails. Through the design of the first information, the disclosure implements the update of a state of buffer occupation of the UE or a state of channel decoding, to facilitate a base station to adjust a transmission policy in real time, thereby improving overall performances.

15 Claims, 10 Drawing Sheets

(51) Int. Cl.
*H04L 1/18* (2006.01)
*H04W 72/04* (2009.01)

(56) References Cited

U.S. PATENT DOCUMENTS

| | | | | |
|---|---|---|---|---|
| 2013/0176981 | A1* | 7/2013 | Earnshaw | H04L 1/1835 |
| | | | | 370/329 |
| 2014/0240171 | A1* | 8/2014 | Cho | G01S 19/13 |
| | | | | 342/357.51 |
| 2016/0329989 | A1* | 11/2016 | Li | H04L 1/0061 |
| 2016/0344515 | A1* | 11/2016 | Aiba | H04L 5/14 |
| 2017/0207895 | A1* | 7/2017 | Yang | H04L 5/0048 |
| 2018/0191413 | A1* | 7/2018 | Suzuki | H04W 16/28 |
| 2018/0367253 | A1* | 12/2018 | Nammi | H04L 1/1812 |
| 2018/0376281 | A1* | 12/2018 | Guo | H04W 52/245 |
| 2019/0273582 | A1* | 9/2019 | Yeo | H04L 1/1887 |

OTHER PUBLICATIONS

Thales. "NR-NTN: Chap 7.3-NR Modifications to Support the Non-Terrestrial Network"3GPP TSGRANI Meeting #93 R1-1807794,May 25, 2018(May 25, 2018), section7.3.3.1.

* cited by examiner

METHOD AND DEVICE IN UE AND BASE STATION FOR WIRELESS COMMUNICATION

CROSS REFERENCE TO RELATED APPLICATIONS

This application is a continuation of International Application No. PCT/CN2019/089055, filed May 29, 2019, claims the priority benefit of Chinese Patent Application No. 201810568614.8, filed on Jun. 5, 2018, the full disclosure of which is incorporated herein by reference.

TECHNICAL FIELD

The disclosure relates to transmission methods and devices in wireless communication systems, and in particular to a transmission method and device for radio signals when a territorial terminal equipment is in direct connection with a non-terrestrial network base station.

BACKGROUND

At present, the study item to support non-terrestrial network in 5G New Radio Access Technology (5G NR) has been approved in $3^{rd}$ Generation Partner Project (3GPP) Radio Access Network (RAN). In non-terrestrial network discussions, one important scenario is that a territorial terminal directly accesses a spaceborne vehicle for communication, the spaceborne vehicle includes one or more of a Geostationary Earth Orbiting (GEO) satellite, a Medium Earth Orbiting (MEO) satellite, a Low Earth Orbit (LEO) satellite, a Highly Elliptical Orbiting (HEO) satellite or an airborne platform.

Compared with territorial base stations, non-terrestrial base stations will have a greater Round Trip Time (RTT) to a territorial terminal since they are deployed at high altitudes. If all slots in an RTT are used for the data transmission of one single UE to improve spectrum efficiency, an extremely high demand will be proposed on a buffer capacity of the UE, that is, the UE needs to use a lot of buffers to store received downlink data which may be correct or not; in view of the above problems, 3GPP puts forwards a Hybrid Automatic Repeat Request (HARQ)-Less transmission method, in which combined gains are dropped so as to ensure a full utilization of time domain resources and in which a UE does not need to cache a currently received downlink radio signal.

SUMMARY

Although the HARQ-Less based downlink data transmission saves the consumption of buffer at the UE side, it will inevitably lead to deterioration in reception performance. Based on the above problems and analysis, the disclosure provides a solution. It should be noted that the embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for wireless communication, wherein the method includes:
 receiving a first signaling and a first radio signal; and
 transmitting first information.

Herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE after channel decoding of the X1 bit(s) or a state of channel decoding of the first code block by the UE after channel decoding of the X1 bit(s); the first information is transmitted through an air interface; and the X1 is a positive integer.

In one embodiment, the above method has the following benefits: the UE reports the buffer occupation of the UE to the base station through transmitting the first information; when the buffer is of high occupation, the base station will perform scheduling for the UE more with the HARQ-Less based downlink data transmission method; when the buffer is of low occupation, the base station will perform scheduling for the UE more with the HARQ process based downlink data transmission method; thus, a more reasonable and efficient optimization of balance is carried out between reception performance and system spectrum efficiency.

In one embodiment, the above method has another following benefit: the UE reports the state of channel decoding of the first code block to the base station through transmitting the first information; when the channel decoding of the first code block fails several times, the base station will perform scheduling for the UE more with the HARQ process based downlink data transmission method; the above method facilitates the base station to determine when to shut down a HARQ-Less transmission and switch back to a HARQ-on transmission, thereby improving reception performance.

According to one aspect of the disclosure, the above method includes:
 receiving a second signaling.

Herein, the second signaling includes a target threshold; the UE determines to transmit the first information according to a relationship between the state of buffer occupation and the target threshold, or the UE determines to transmit the first information according to a relationship between the state of channel decoding and the target threshold.

In one embodiment, the above method has the following benefits: the target threshold is configured through the second signaling, and the UE determines whether to transmit the first information through comparing with the target threshold; the above method avoids the UE frequently transmitting the first information, thereby saving uplink resources.

According to one aspect of the disclosure, the above method includes:
 receiving a third signaling.

Herein, the third signaling is used for determining a first parameter of a first base station, the first parameter is related to the target threshold, and the first base station transmits the first radio signal; and the first parameter includes one of a type of the first base station, a vertical distance between the first base station and a ground surface, a range for a vertical distance between the first base station and a ground surface or a Round Trip Time (RTT) of the first base station.

In one embodiment, the above method has the following benefits: the state of buffer occupation of the UE is affected not only by the number of times the UE is actually scheduled and the size of time-frequency resources occupied by the scheduled data, but also by the size of RTT between the UE and the base station; the value of RTT is related to at least one of a type of the first base station, a vertical distance between the first base station and a ground surface or a range for a vertical distance between the first base station and a ground surface; through receiving the first parameter, the UE can determine the range of the target threshold, thereby properly configuring the target threshold.

According to one aspect of the disclosure, the above method includes:

transmitting second information.

Herein, the second information is used for determining a capability of the UE, and the capability of the UE is related to the target threshold; and the second information is transmitted through an air interface.

In one embodiment, the above method has the following benefits: the selection of the target threshold is also related to the capacity of the UE, that is, to the size of the buffer included in the UE; when the buffer size is large, the target threshold may be large; when the buffer size is small, the target threshold may be small; the above method properly configures the target threshold.

According to one aspect of the disclosure, the above method includes:

receiving a fourth signaling.

Herein, the fourth signaling is used for indicating time-frequency resources occupied by the first radio signal, and a number of resource elements included in the time-frequency resources occupied by the first radio signal is used for determining a number of bits included in the first code block.

The disclosure provides a method in a base station for wireless communication, wherein the method includes:

transmitting a first signaling and a first radio signal; and receiving first information.

Herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of a first terminal after channel decoding of the X1 bit(s) or a state of channel decoding of the first code block by a first terminal after channel decoding of the X1 bit(s); the first information is transmitted through an air interface; the X1 is a positive integer; and a receiver of the first radio signal includes the first terminal.

According to one aspect of the disclosure, the above method includes:

transmitting a second signaling.

Herein, the second signaling includes a target threshold; the first terminal determines to transmit the first information according to a relationship between the state of buffer occupation and the target threshold, or the first terminal determines to transmit the first information according to a relationship between the state of channel decoding and the target threshold.

According to one aspect of the disclosure, the above method includes:

transmits a third signaling.

Herein, the third signaling is used for determining a first parameter of the base station, the first parameter is related to the target threshold; and the first parameter includes one of a type of the base station, a vertical distance between the base station and a ground surface, a range for a vertical distance between the base station and a ground surface or an RTT of the base station.

According to one aspect of the disclosure, the above method includes:

receiving second information.

Herein, the second information is used for determining a capability of the first terminal, and the capability of the first terminal is related to the target threshold; and the second information is transmitted through an air interface.

According to one aspect of the disclosure, the above method includes:

transmitting a fourth signaling.

Herein, the fourth signaling is used for indicating time-frequency resources occupied by the first radio signal, and a number of resource elements included in the time-frequency resources occupied by the first radio signal is used for determining a number of bits included in the first code block.

The disclosure provides a UE for wireless communication, wherein the method includes:

a first transceiver, to receive a first signaling and a first radio signal; and a first transmitter, to transmit first information.

Herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE after channel decoding of the X1 bit(s) or a state of channel decoding of the first code block by the UE after channel decoding of the X1 bit(s); the first information is transmitted through an air interface; and the X1 is a positive integer.

In one embodiment, the above UE for wireless communication is characterized in that: the first transceiver also receives a second signaling; the second signaling includes a target threshold; the UE determines to transmit the first information according to a relationship between the state of buffer occupation and the target threshold, or the UE determines to transmit the first information according to a relationship between the state of channel decoding and the target threshold.

In one embodiment, the above UE for wireless communication is characterized in that: the first transceiver also receives a third signaling; the third signaling is used for determining a first parameter of a first base station, the first parameter is related to the target threshold, and the first base station transmits the first radio signal; and the first parameter includes one of a type of the first base station, a vertical distance between the first base station and a ground surface, a range for a vertical distance between the first base station and a ground surface or an RTT of the base station.

In one embodiment, the above UE for wireless communication is characterized in that: the first transceiver also transmits second information; the second information is used for determining a capability of the UE, and the capability of the UE is related to the target threshold;

and the second information is transmitted through an air interface.

In one embodiment, the above UE for wireless communication is characterized in that: the first transceiver also receives a fourth signaling; the fourth signaling is used for indicating time-frequency resources occupied by the first radio signal, and a number of resource elements included in the time-frequency resources occupied by the first radio signal is used for determining a number of bits included in the first code block.

The disclosure provides a base station for wireless communication, wherein the base station includes:

a second transceiver, to transmit a first signaling and a first radio signal; and a first receiver, to receive first information.

Herein, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of a first terminal after channel decoding of the X1 bit(s) or a state of channel decoding of the first code block by a first terminal after channel decoding of the X1 bit(s); the first information is transmitted through an air interface; the X1 is a positive integer; and a receiver of the first radio signal includes the first terminal.

In one embodiment, the above base station for wireless communication is characterized in that: the second transceiver also transmits a second signaling; the second signaling includes a target threshold; the first terminal determines to transmit the first information according to a relationship between the state of buffer occupation and the target threshold, or the first terminal determines to transmit the first information according to a relationship between the state of channel decoding and the target threshold.

In one embodiment, the above base station for wireless communication is characterized in that: the second transceiver also transmits a third signaling; the third signaling is used for determining a first parameter of the base station, the first parameter is related to the target threshold; and the first parameter includes one of a type of the base station, a vertical distance between the base station and a ground surface, a range for a vertical distance between the base station and a ground surface or an RTT of the base station.

In one embodiment, the above base station for wireless communication is characterized in that: the second transceiver also receives second information; the second information is used for determining a capability of the first terminal, and the capability of the first terminal is related to the target threshold; and the second information is transmitted through an air interface.

In one embodiment, the above base station for wireless communication is characterized in that: the second transceiver also transmits a fourth signaling; the fourth signaling is used for indicating time-frequency resources occupied by the first radio signal, and a number of resource elements included in the time-frequency resources occupied by the first radio signal is used for determining a number of bits included in the first code block.

In one embodiment, compared with conventional schemes, the disclosure has the following advantages.

The UE reports the buffer occupation of the UE to the base station through transmitting the first information; when the buffer is of high occupation, the base station will perform scheduling for the UE more with the HARQ-Less based downlink data transmission method; when the buffer is of low occupation, the base station will perform scheduling for the UE more with the HARQ process based downlink data transmission method; thus, a more reasonable and efficient optimization of balance is carried out between reception performance and system spectrum efficiency.

The UE reports the state of channel decoding of the first code block to the base station through transmitting the first information; when the channel decoding of the first code block fails several times, the base station will perform scheduling for the UE more with the HARQ process based downlink data transmission method; the above method facilitates the base station to determine when to shut down a HARQ-Less transmission and switch back to a HARQ-on transmission, thereby improving reception performance.

The target threshold is configured through the second signaling, and the UE determines whether to transmit the first information through comparing with the target threshold; the above method avoids the UE frequently transmitting the first information, thereby saving uplink resources.

The state of buffer occupation of the UE is affected not only by the number of times the UE is actually scheduled and the size of time-frequency resources occupied by the scheduled data, but also by the size of RTT between the UE and the base station; the value of RTT is related to at least one of a type of the first base station, a vertical distance between the first base station and a ground surface or a range for a vertical distance between the first base station and a ground surface; through receiving the first parameter, the UE can determine the range of the target threshold, thereby properly configuring the target threshold.

The selection of the target threshold is also related to the capacity of the UE, that is, to the size of the buffer included in the UE; when the buffer size is large, the target threshold may be large; when the buffer size is small, the target threshold may be small; the above method properly configures the target threshold.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
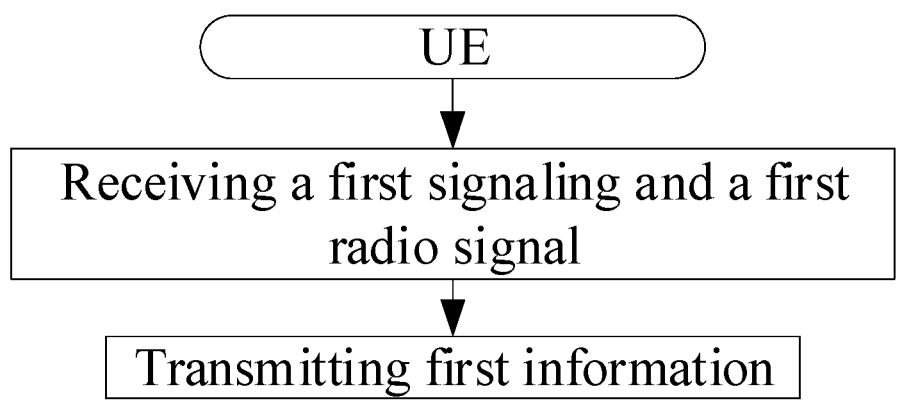
FIG. 1 is a flowchart of a first signaling according to one embodiment of the disclosure.

Embodiment 1 illustrates a flowchart of a first signaling, as shown in FIG. 1.

In Embodiment 1, the UE in the disclosure first receives a first signaling and a first radio signal, and then transmits first information; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE after channel decoding of the X1 bit(s) or a state of channel decoding of the first code block by the UE after channel decoding of the X1 bit(s); the first information is transmitted through an air interface; and the X1 is a positive integer.

In one subembodiment, the first signaling is a physical layer signaling.

In one subembodiment, the first signaling includes a configuration information group for the first radio signal, and the configuration information group includes at least one of a position of occupied time domain resources, a position of occupied frequency domain resources or a Modulation and Coding Scheme (MCS).

In one affiliated embodiment of the above subembodiment, the configuration information group includes configuration information other than a HARQ process number.

In one subembodiment, the state of buffer occupation is an integer in a range of 0 to 100.

In one subembodiment, the state of buffer is greater than a first threshold, and the UE transmits the first information; and the first threshold is a positive integer in a range of 0 to 100.

In one subembodiment, the state of buffer is greater than a first threshold, the UE transmits the first information, the first information includes 1 bit, and the 1 bit is used for indicating that the state of buffer occupation of the UE is greater than the first threshold after channel decoding of the X1 bit(s).

In one affiliated embodiment of the above two subembodiments, the first threshold is fixed, or the first threshold is configured through a higher layer signaling.

In one subembodiment, the state of buffer is less than a second threshold, and the UE transmits the first information; and the second threshold is a positive integer in a range of 0 to 100.

In one subembodiment, the state of buffer is less than a second threshold, the UE transmits the first information, the first information includes 1 bit, and the 1 bit is used for indicating that the state of buffer occupation of the UE is less than the second threshold after channel decoding of the X1 bit(s).

In one affiliated embodiment of the above two subembodiments, the second threshold is fixed, or the second threshold is configured through a higher layer signaling.

In one subembodiment, the state of buffer occupation is used for indicating a percentage of an occupied buffer size of the UE in a maximum buffer size of the UE.

In one subembodiment, the state of buffer occupation is used for indicating a percentage of an unoccupied buffer size of the UE in a maximum buffer size of the UE.

In one subembodiment, the state of buffer occupation of the UE after channel decoding of the X1 bit(s) includes an occupied buffer size of the UE after channel decoding of the X1 bit(s).

In one subembodiment, the state of buffer occupation of the UE after channel decoding of the X1 bit(s) includes a remaining buffer size of the UE after channel decoding of the X1 bit(s).

In one subembodiment, the state of buffer occupation of the UE after channel decoding of the X1 bit(s) includes a proportion of an occupied buffer size of the UE to a total buffer size of the UE after channel decoding of the X1 bit(s).

In one subembodiment, the state of buffer occupation of the UE after channel decoding of the X1 bit(s) includes a proportion of an occupied buffer size of the UE to a total buffer size of the UE available for downlink reception after channel decoding of the X1 bit(s).

In one subembodiment, the state of buffer occupation of the UE after channel decoding of the X1 bit(s) includes a proportion of an unoccupied buffer size of the UE to a total buffer size of the UE after channel decoding of the X1 bit(s).

In one subembodiment, the state of buffer occupation of the UE after channel decoding of the X1 bit(s) includes a proportion of an unoccupied buffer size of the UE to a total buffer size of the UE available for downlink reception after channel decoding of the X1 bit(s).

In one subembodiment, the UE also receives K radio signal(s) for the first code block before receiving the first radio signal, neither the K radio signal(s) nor the first radio signal is correctly received by the UE, the state of channel decoding of the first code block is used for determining that none of the (K+1) downlink transmissions of the first code block are correctly received, and the K is a positive integer.

In one affiliated embodiment of the above subembodiment, the state of channel decoding of the first code block is used for indicating (K+1).

In one affiliated embodiment of the above subembodiment, the state of channel decoding of the first code block includes a given bit, the (K+1) is greater than a third threshold, and the UE transmits the first information; the first bit is used for indicating that the (K+1) is greater than the third threshold; and the third threshold is a positive integer.

In one example of the above affiliated embodiment, the third threshold is fixed, or the third threshold is configured through a higher layer signaling.

In one subembodiment, the first signaling includes a first field, the first field includes a first subfield and a second subfield, the first subfield occupies M1 bits, the second subfield occupies M2 bits, and both the M1 and the M2 are positive integers.

In one affiliated embodiment of the above subembodiment, the M1 is equal to 1, and the first subfield is used for indicating that X1 bit(s) cannot be used for decoding of the first code block with combining.

In one affiliated embodiment of the above subembodiment, the M1 is equal to 1, and the first subfield is used for indicating that the first radio signal is a transmission without a HARQ process.

In one affiliated embodiment of the above subembodiment, the M1 is equal to 1, and the first subfield is used for indicating there is no retransmission for the first radio signal.

In one affiliated embodiment of the above subembodiment, the second subfield is used for indicating a HARQ process number corresponding to the first radio signal.

In one subembodiment, the phrase that the first signaling is used for determining that the X1 bit(s) cannot be used for decoding of the first code block with combining when channel decoding for the X1 bit(s) fails includes: the base station in the disclosure performs a retransmission of the first code block with RV=0, after receiving an NACK indication corresponding to the first radio signal.

In one subembodiment, the phrase that the first signaling is used for determining that the X1 bit(s) cannot be used for decoding of the first code block with combining when channel decoding for the X1 bit(s) fails includes: the UE determines autonomously whether the first bit block needs to be buffered, and the base station assumes that the first bit block is not buffered by the UE.

In one subembodiment, the first code block is one Code Block (CB).

In one subembodiment, the first code block is one Transmission Block (TB).

In one subembodiment, the first code block is one of CBs obtained after one TB is processed sequentially through Cyclic Redundancy Check (CRC) addition, code block segmentation or CB CRC addition.

In one subembodiment, the first code block is obtained after one TB is processed through CRC addition.

In one subembodiment, the processing of soft buffer or soft combining for the first code block transmitted in the first radio signal is different from the processing for another CB transmitted in one radio signal other than the first radio signal.

In one subembodiment, a code block in one radio signal other than the first radio signal is different from the first code block in processing of soft buffer or soft combining.

In one subembodiment, the first signaling is one piece of Downlink Control Information (DCI).

In one subembodiment, the first signaling is one downlink grant.

In one subembodiment, the phrase that the first information is transmitted through an air interface refers that: the first information is transmitted through a radio interface between the UE and the base station.

In one subembodiment, the first radio signal belongs to a first HARQ process, and the first signaling is used for determining a number of bits in the first HARQ process that can be used for decoding with combining.

In one subembodiment, the first radio signal is an initial transmission of a TB in one HARQ process.

In one subembodiment, the first radio signal is a retransmission of a TB in one HARQ process.

In one subembodiment, the first radio signal is an initial transmission of a CB in one HARQ process.

In one subembodiment, the first radio signal is a retransmission of a CB in one HARQ process.

In one subembodiment, the first radio signal is a retransmission of one or more Code Block Groups (CBGs) in one HARQ process.

In one subembodiment, the combining decoding in the disclosure refers to channel decoding based on soft combining.

In one subembodiment, the combining decoding in the disclosure refers to channel decoding based on chase combining.

In one subembodiment, the combining decoding in the disclosure refers to channel decoding based on Incremental Redundancy (IR).

In one subembodiment, the combining decoding in the disclosure refers to channel decoding based on a mixing of IR and chase combining.

In one subembodiment, the first signaling is a physical layer signaling.

In one subembodiment, the first signaling includes a configuration information group for the first radio signal, and the configuration information group includes at least one of a position of occupied time domain resources, a position of occupied frequency domain resources or an MCS.

In one affiliated embodiment of the above subembodiment, the configuration information group includes configuration information other than a HARQ process number.

Embodiment 2

Figure 2:
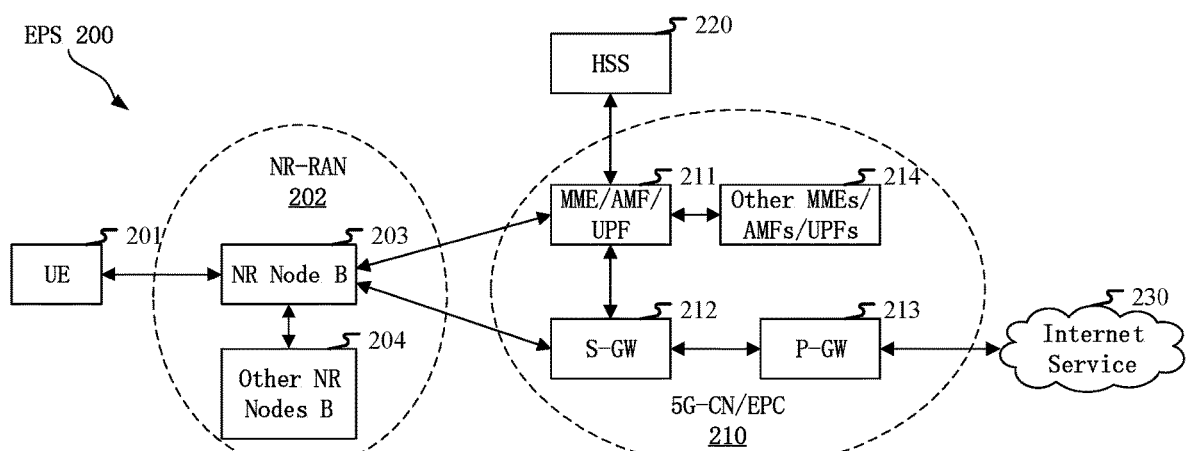
FIG. 2 is a diagram illustrating a network architecture according to one embodiment of the disclosure.

Embodiment 2 illustrates a diagram of a network architecture, as shown in FIG. 2.

Embodiment 2 illustrates a diagram of a network architecture according to the disclosure, as shown in FIG. 2. FIG. 2 is a diagram illustrating a network architecture 200 of NR 5G Long-Term Evolution (LTE) and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node (gNB) 203 and other gNBs 204. The gNB 203 provides UE 201 oriented user plane and control plane protocol terminations. The gNB 203 may be connected to other gNBs 204 via an Xn interface. The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-territorial network base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the first base station in the disclosure.

In one subembodiment, the UE 201 is one terminal supporting a Non-Territorial Network (NTN).

In one subembodiment, the UE 201 is one terminal supporting long-latency wireless communication.

In one subembodiment, the gNB 203 supports NTN based radio services.

In one subembodiment, the gNB 203 supports long-latency wireless communication.

Embodiment 3

Figure 3:
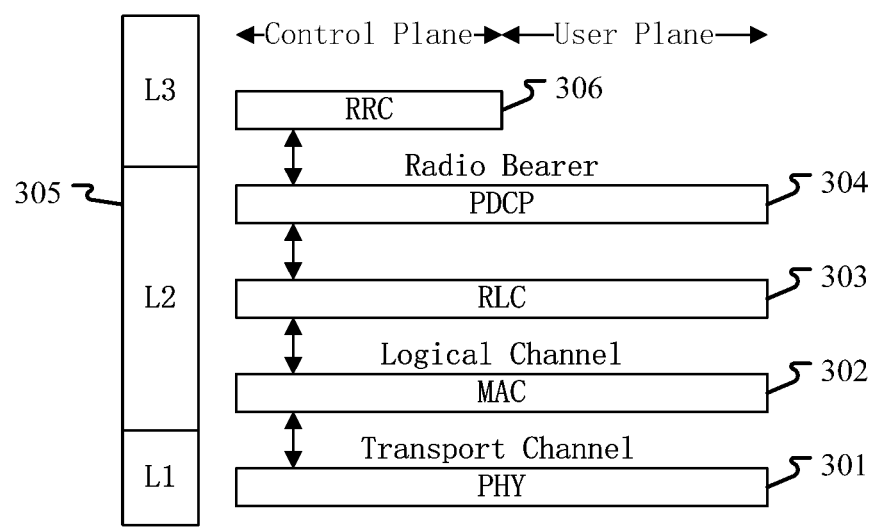
FIG. 3 is a diagram illustrating an embodiment of a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first signaling in the disclosure is generated on the PHY 301.

In one subembodiment, the first radio signal in the disclosure is generated on the PHY 301.

In one subembodiment, the first radio signal in the disclosure is generated on the MAC sublayer 302.

In one subembodiment, the first information in the disclosure is generated on the MAC sublayer 302.

In one subembodiment, the first information in the disclosure is generated on the PHY 301.

In one subembodiment, the second signaling in the disclosure is generated on the RRC sublayer 306.

In one subembodiment, the third signaling in the disclosure is generated on the RRC sublayer 306.

In one subembodiment, the second information in the disclosure is generated on the RRC sublayer 306.

In one subembodiment, the fourth signaling in the disclosure is generated on the PHY 301.

Embodiment 4

Figure 4:
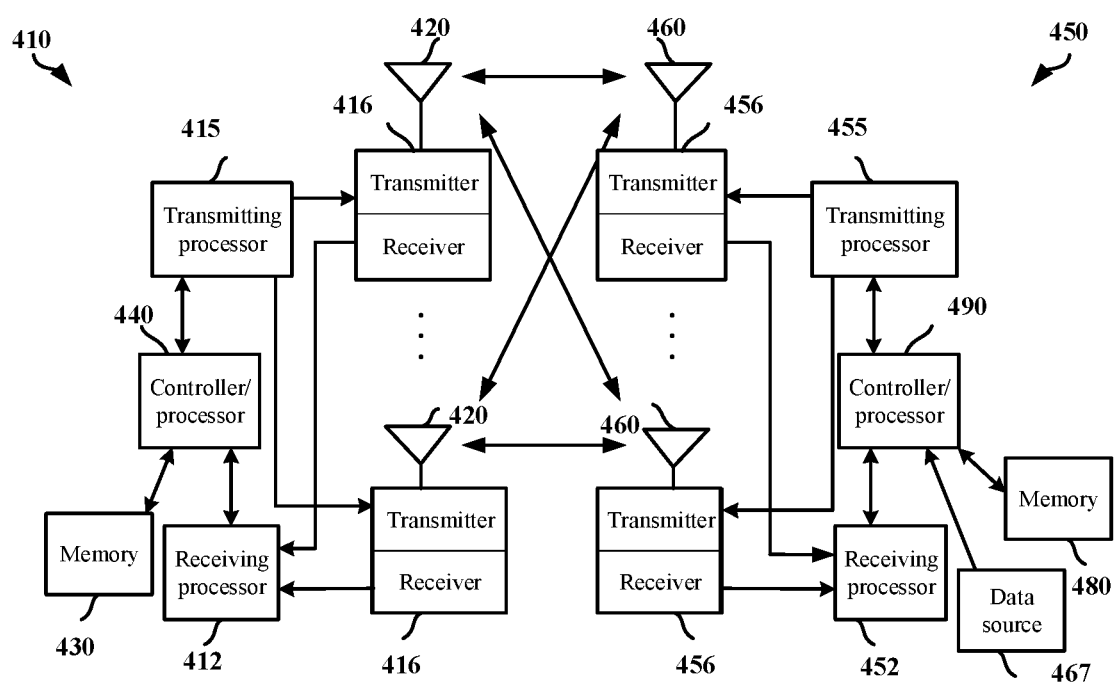
FIG. 4 is a diagram illustrating an eNB and a UE according to one embodiment of the disclosure.

Embodiment 4 illustrates a diagram of a base station and a UE according to the disclosure, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In Downlink (DL) transmission, processes relevant to the base station device 410 may include the following.

A higher-layer packet is provided to the controller/processor 440. The controller/processor 440 provides header compression, encryption, packet segmentation and reordering, multiplexing and de-multiplexing between a logical channel and a transport channel, to implement L2 protocols used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for transmission requirements, and the scheduling unit is configured to schedule air interface resources corresponding to transmission requirements.

The transmitting processor 415 receives a bit stream output from the controller/processor 440, and performs various signal transmitting processing functions of L1 layer (that is, PHY), including encoding, interleaving, scrambling, modulation, power control/allocation, generation of physical layer control signalings (including PBCH, PDCCH, PHICH, PCFICH, reference signal), etc.

The transmitting processor 415 receives a bit stream output from the controller/processor 440, and performs various signal transmitting processing functions of L1 layer (that is, PHY), including multiantenna transmitting, spreading, code division multiplexing, precoding, etc.

The transmitter 416 is configured to convert the baseband signal provided by the MIMO transmitting processor 441 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In Downlink (DL) transmission, processes relevant to the UE 450 may include the following.

The receiver 456 is configured to convert a radio-frequency signal received via the antenna 460 into a baseband signal and provide the baseband signal to receiving processor 452.

The receiving processor 452 performs various signal receiving processing functions of an L1 layer (that is, PHY), including decoding, de-interleaving, descrambling, demodulation, extraction of physical layer control signaling, etc.

The receiving processor 452 performs various signal receiving processing functions of an L1 layer (that is, PHY), including multiantenna receiving, despreading, code division multiplexing, precoding, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least receives a first signaling and a first radio signal, and transmits first information; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE after channel decoding of the X1 bit(s) or a state of channel decoding of the first code block by the UE after channel decoding of the X1 bit(s); the first information is transmitted through an air interface; and the X1 is a positive integer.

In one subembodiment, the UE 450 includes a memory that stores a computer readable instruction program. The computer readable instruction program generates an action when executed by at least one processor. The action includes: receiving a first signaling and a first radio signal, and transmitting first information; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE after channel decoding of the X1 bit(s) or a state of channel decoding of the first code block by the UE after channel decoding of the X1 bit(s); the first information is transmitted through an air interface; and the X1 is a positive integer.

In one subembodiment, the gNB 410 device includes at least one processor and at least one memory. The at least one memory includes computer program codes. The at least one memory and the computer program codes are configured to be used in collaboration with the at least one processor. The gNB 410 at least transmits a first signaling and a first radio signal, and receives first information; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of a first terminal after channel decoding of the X1 bit(s) or a state of channel decoding of the first code block by a first terminal after channel decoding of the X1 bit(s); the first information is transmitted through an air interface; the X1 is a positive integer; and a receiver of the first radio signal includes the first terminal.

In one embodiment, the gNB 410 includes a memory that stores a computer readable instruction program. The computer readable instruction program generates an action when executed by at least one processor. The action includes transmitting a first signaling and a first radio signal, and receiving first information; only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of a first terminal after channel decoding of the X1 bit(s) or a state of channel decoding of the first code block by a first terminal after channel decoding of the X1 bit(s); the first information is transmitted through an air interface; the X1 is a positive integer; and a receiver of the first radio signal includes the first terminal.

In one subembodiment, the UE 450 corresponds to the UE in the disclosure.

In one subembodiment, the gNB 410 corresponds to the base station in the disclosure.

In one subembodiment, at least the former two of the receiver 456, the receiving processor 452 and the controller/processor 490 are used for receiving a first signaling and a first radio signal.

In one subembodiment, at least the former two of the transmitter 456, the transmitting processor 455 and the controller/processor 490 are used for transmitting first information.

In one subembodiment, at least the former two of the receiver 456, the receiving processor 452 and the controller/processor 490 are used for receiving a second signaling.

In one subembodiment, at least the former two of the receiver 456, the receiving processor 452 and the controller/processor 490 are used for receiving a third signaling.

In one subembodiment, at least the former two of the transmitter 456, the transmitting processor 455 and the controller/processor 490 are used for transmitting second information.

In one subembodiment, at least the former two of the receiver 456, the receiving processor 452 and the controller/processor 490 are used for receiving a fourth signaling.

In one subembodiment, at least the former two of the transmitter 416, the transmitting processor 415 and the controller/processor 440 are used for transmitting a first signaling and a first radio signal.

In one subembodiment, at least the former two of the receiver 416, the receiving processor 412 and the controller/processor 440 are used for receiving first information.

In one subembodiment, at least the former two of the transmitter 416, the transmitting processor 415 and the controller/processor 440 are used for transmitting a second signaling.

In one subembodiment, at least the former two of the transmitter 416, the transmitting processor 415 and the controller/processor 440 are used for transmitting a third signaling.

In one subembodiment, at least the former two of the receiver 416, the receiving processor 412 and the controller/processor 440 are used for receiving second information.

In one subembodiment, at least the former two of the transmitter 416, the transmitting processor 415 and the controller/processor 440 are used for transmitting a fourth signaling.

Embodiment 5

Figure 5:
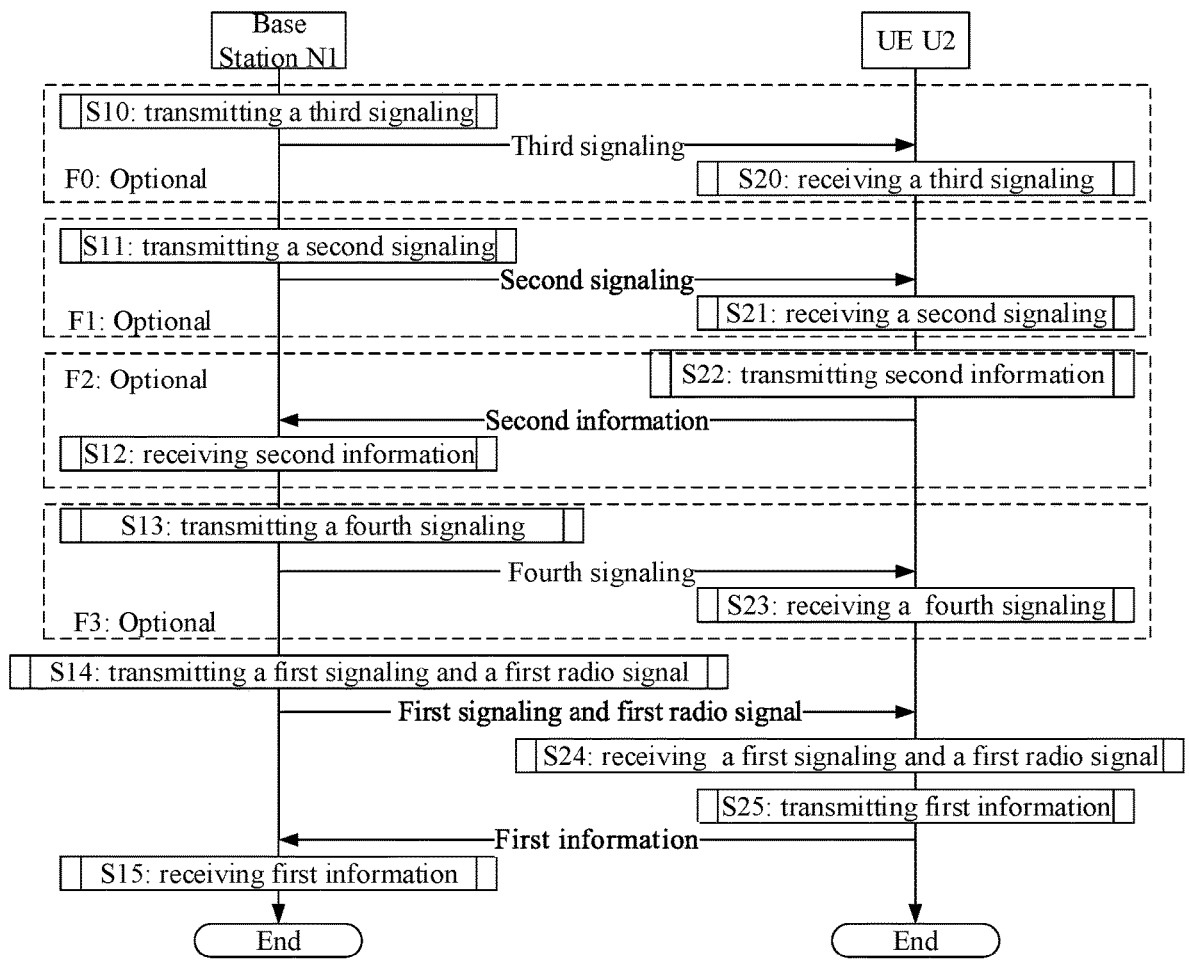
FIG. 5 is a flowchart of a first radio signal according to one embodiment of the disclosure.

Embodiment 5 illustrates a flowchart of a first radio signal, as shown in FIG. 5. In FIG. 5, a base station N1 is a maintenance base station for a serving cell of a UE U2. In FIG. 5, steps in boxes F0 to F3 are optional.

The base station N1 transmits a third signaling in S10, transmits a second signaling in S11, receives second information in S12, transmits a fourth signaling in S13, transmits a first signaling and a first radio signal in S14, and receives first information in S15.

The UE U2 receives a third signaling in S20, receives a second signaling in S21, transmits second information in S22, receives a fourth signaling in S23, receives a first signaling and a first radio signal in S24, and transmits first information in S25.

In Embodiment 5, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE U2 after channel decoding of the X1 bit(s) or a state of channel decoding of the first code block by the UE U2 after channel decoding of the X1 bit(s); the first information is transmitted through an air interface; the X1 is a positive integer; the second signaling includes a target threshold; the UE U2 determines to transmit the first information according to a relationship between the state of buffer occupation and the target threshold, or the UE U2 determines to transmit the first information according to a relationship between the state of channel decoding and the target threshold; the third signaling is used for determining a first parameter of the base station N1, the first parameter is related to the target threshold; and the first parameter includes one of a type of the base station N1, a vertical distance between the base station N1 and a ground surface, a range for a vertical distance between the base station N1 and a ground surface or an RTT of the base station N1; the second information is used for determining a capability of the UE U2, and the capability of the UE U2 is related to the target threshold; the second information is transmitted through an air interface; the fourth signaling is used for indicating time-frequency resources occupied by the first radio signal, and a number of resource elements included in the time-frequency resources occupied by the first radio signal is used for determining a number of bits included in the first code block.

In one subembodiment, the first information is used for indicating a state of buffer occupation of the UE U2 after channel decoding of the X1 bit(s).

In one affiliated embodiment of the above subembodiment, the UE U2 determines to transmit the first information according to a relationship between the state of buffer occupation and the target threshold.

In one subembodiment, the first information is used for indicating a state of channel decoding of the first code block by the UE U2 after channel decoding of the X1 bit(s).

In one affiliated embodiment of the above subembodiment, the UE U2 determines to transmit the first information according to a relationship between the state of channel decoding and the target threshold.

In one subembodiment, a relationship between the state of channel decoding and the target threshold and a relationship between the state of buffer occupation and the target threshold are used together for determining to transmit the first information.

In one subembodiment, the second signaling is one RRC signaling.

In one subembodiment, the second signaling is specific to the UE U2.

In one subembodiment, the target threshold is the first threshold in the disclosure, and the phrase that the UE U2 determines to transmit the first information according to a relationship between the state of buffer occupation and the target threshold refers that: the state of buffer occupation is greater than the first threshold, and the UE U2 transmits the first information.

In one subembodiment, the target threshold is the second threshold in the disclosure, and the phrase that the UE U2 determines to transmit the first information according to a relationship between the state of buffer occupation and the target threshold refers that: the state of buffer occupation is less than the second threshold, and the UE U2 transmits the first information.

In one subembodiment, the target threshold is the third threshold in the disclosure, and the phrase that the UE U2 determines to transmit the first information according to a relationship between the state of channel decoding and the target threshold refers that: the state of channel decoding is greater than the third threshold, and the UE U2 transmits the first information.

In one subembodiment, the first parameter includes a type of the base station N1.

In one subembodiment, the first parameter includes a vertical distance between the base station N1 and a ground surface.

In one subembodiment, the first parameter includes an RTT of the base station N1.

In one subembodiment, the type of the base station N1 includes at least one of a GEO satellite, an MEO satellite, an LEO satellite, an HEO satellite or an airborne platform.

In one subembodiment, the first parameter is a first ID, and the first ID corresponds to the base station N1.

In one affiliated embodiment of the above subembodiment, the first ID is related to a vertical distance between the base station N1 and a ground surface.

In one affiliated embodiment of the above subembodiment, the first ID is one of K1 candidate IDs, the target threshold is one of K1 candidate thresholds, and a sequence number of the first ID in the K1 candidate IDs is used for determining the target threshold from the K1 candidate thresholds.

In one subembodiment, the first parameter is used for determining a range for a vertical distance between the base station N1 and a ground surface.

In one affiliated embodiment of the above subembodiment, the phrase that the range for a vertical distance between the base station N1 and a ground surface refers that: a distance between the base station N1 and a ground surface is between S1 km (kilometer) and S2 km, the S1 is a positive integer, and the S2 is a positive integer greater than the S1.

In one subembodiment, the capability of the UE U2 includes: a buffer size of the UE U2.

In one affiliated embodiment of the above subembodiment, the buffer size refers to a buffer size that the UE U2 assigns to downlink transmission.

In one affiliated embodiment of the above subembodiment, the buffer size refers to a buffer size that the UE U2 assigns to all data transmissions.

In one subembodiment, the second information includes one or more Information Elements (IEs) among UE capability information elements in 3GPP TS 38.331.

In one subembodiment, the phrase that the second information is transmitted through an air interface refers that: the second information is transmitted through a radio signal between the UE U2 and the base station N1.

In one subembodiment, the fourth signaling is one DCI.

In one subembodiment, the fourth signaling is one downlink grant.

In one subembodiment, the first signaling and the fourth signaling belong to one same DCI.

In one affiliated embodiment of the above subembodiment, the first signaling is one field in the DCI.

In one affiliated embodiment of the above subembodiment, the fourth signaling is other fields in the DCI other than the first signaling.

In one subembodiment, the first signaling and the fourth signaling belong to one same downlink grant.

In one subembodiment, the fourth signaling is transmitted through an air interface.

In one subembodiment, the air interface in the disclosure is an interface between the UE 201 and the NR node B 203 illustrated in Embodiment 2.

In one subembodiment, the RE occupies one subcarrier in frequency domain, and the RE occupies a duration of one Orthogonal Frequency Division Multiplexing (OFDM) symbol in time domain.

Embodiment 6

Figure 6:
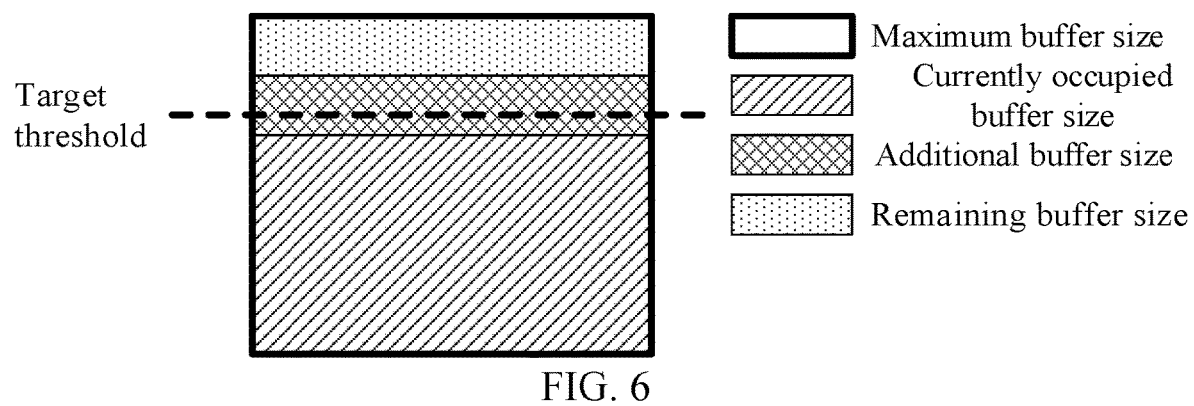
FIG. 6 is a diagram illustrating a state of buffer occupation according to one embodiment of the disclosure.

Embodiment 6 illustrates a diagram of a state of buffer occupation, as shown in FIG. 6. In FIG. 6, a rectangular box corresponds to a maximum buffer size of the UE in the disclosure; a portion filled with slashes represents a currently occupied buffer size of the UE before receiving the first radio signal in the disclosure, a portion filled with grids represents an additional buffer size needed by the combing decoding corresponding to the channel decoding of the X1 bit(s) in the disclosure, a bold dash line represents the target threshold in the disclosure, and a portion filled with dots represents a remaining buffer size of the maximum buffer size minus the currently occupied buffer size and the additional buffer size.

In one subembodiment, the currently occupied buffer size plus the additional buffer size is greater than the target threshold, and the UE transmits the first information.

In one subembodiment, the remaining buffer size is less than the target threshold, and the UE transmits the first information.

In one subembodiment, the maximum buffer size of the UE is a total buffer size of the UE.

In one subembodiment, the maximum buffer size of the UE is a total buffer size of the UE available for downlink reception.

In one subembodiment, the maximum buffer size of the UE is a total buffer size of the UE assigned to a given carrier, and the first radio signal in the disclosure is transmitted in the given carrier.

Embodiment 7

Figure 7:
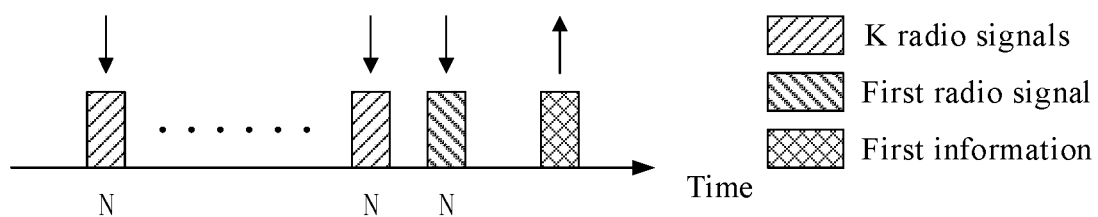
FIG. 7 is a diagram illustrating first information according to one embodiment of the disclosure.

Embodiment 7 illustrates a diagram of first information, as shown in FIG. 7. In FIG. 7, the first information is used for indicating a state of channel decoding of the first code block by the UE after channel decoding of the X1 bit(s), the UE also receives K radio signal(s) for the first code block before receiving the first radio signal, neither the K radio signal(s) nor the first radio signal is correctly received by the UE, the state of channel decoding of the first code block is used for determining that none of the (K+1) downlink transmissions of the first code block are correctly received, and the K is a positive integer; the N shown in FIG. 7 represents an incorrect reception, a down arrow represents a downlink transmission, and an up arrow represents an uplink transmission.

In one subembodiment, the state of channel decoding of the first code block is used for indicating (K+1).

In one subembodiment, the state of channel decoding of the first code block includes a given bit, the (K+1) is greater than a third threshold, and the UE transmits the first information; the given bit is used for indicating that the (K+1) is greater than the third threshold; and the third threshold is equal to a positive integer.

In one affiliated embodiment of the above subembodiment, the third threshold is fixed, or the third threshold is configured through a higher layer signaling.

Embodiment 8

Figure 8:
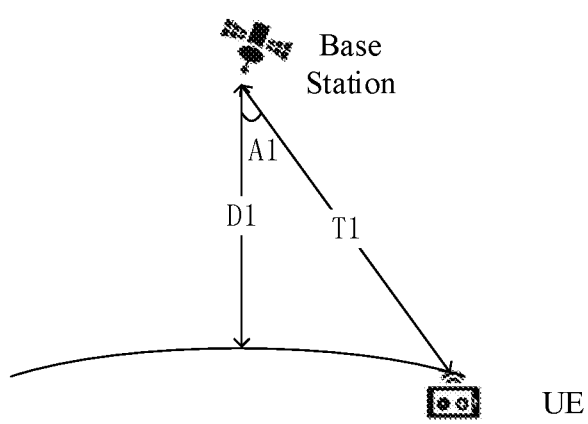
FIG. 8 is a diagram illustrating a UE and a base station according to one embodiment of the disclosure.

Embodiment 8 illustrates a diagram of a UE and a base station, as shown in FIG. 8. In FIG. 8, the base station is a non-territorial base station, and the UE is territorial UE; a vertical distance between the base station and a ground surface is D1 km, an RTT between the base station and the UE is equal to T1 ms, and an angle of inclination between the base station and the UE is A1 degrees.

In one subembodiment, the base station is one of a GEO satellite, an MEO satellite, an LEO satellite, an HEO satellite or an airborne platform.

In one subembodiment, the D1 has a value related to a value of the T1.

In one subembodiment, the A1 has a value related to a value of the T1.

In one subembodiment, the first parameter in the disclosure is also used for indicating the A1.

Embodiment 9

Figure 9:
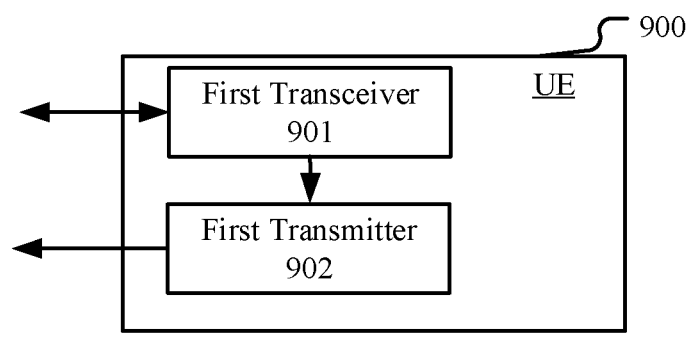
FIG. 9 is a structure block diagram illustrating a processing device in a UE according to one embodiment of the disclosure.

Embodiment 9 illustrates a structure block diagram of a processing device in a UE, as shown in FIG. 9. In FIG. 9, the processing device 900 in the UE mainly includes a first transceiver 901 and a first transmitter 902.

The first transceiver 901 receives a first signaling and a first radio signal.

The first transmitter 902 transmits first information.

In Embodiment 9, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE after channel decoding of the X1 bit(s) or a state of channel decoding of the first code block by the UE after channel decoding of the X1 bit(s); the first information is transmitted through an air interface; and the X1 is a positive integer.

In one subembodiment, the first transceiver 901 also receives a second signaling; the second signaling includes a target threshold; the UE determines to transmit the first information according to a relationship between the state of buffer occupation and the target threshold, or the UE determines to transmit the first information according to a relationship between the state of channel decoding and the target threshold.

In one subembodiment, the first transceiver 901 also receives a third signaling; the third signaling is used for determining a first parameter of a first base station, the first parameter is related to the target threshold, and the first base station transmits the first radio signal; and the first parameter includes one of a type of the first base station, a vertical distance between the first base station and a ground surface, a range for a vertical distance between the first base station and a ground surface or an RTT of the base station.

In one subembodiment, the first transceiver 901 also transmits second information; the second information is used for determining a capability of the UE, and the capability of the UE is related to the target threshold; and the second information is transmitted through an air interface.

In one subembodiment, the first transceiver 901 also receives a fourth signaling; the fourth signaling is used for indicating time-frequency resources occupied by the first radio signal, and a number of resource elements included in the time-frequency resources occupied by the first radio signal is used for determining a number of bits included in the first code block.

In one subembodiment, the first transceiver 901 includes at least the former four of the transmitter/receiver 456, the transmitting processor 455, the receiving processor 452 and the controller/processor 490 illustrated in Embodiment 4.

In one subembodiment, the first transmitter 902 includes at least the former two of the transmitter 456, the transmitting processor 455 and the controller/processor 490 illustrated in Embodiment 4.

Embodiment 10

Figure 10:
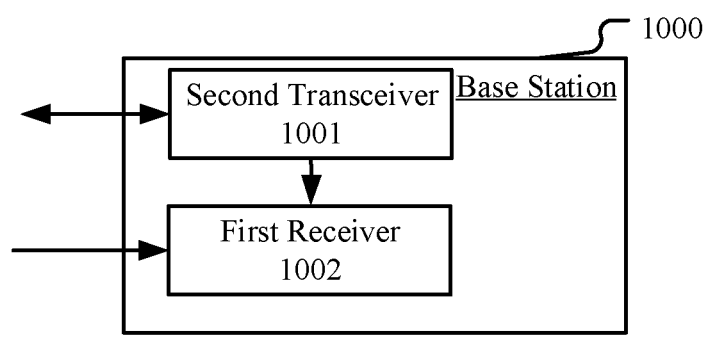
FIG. 10 is a structure block diagram illustrating a processing device in base station according to one embodiment of the disclosure.

Embodiment 10 illustrates a structure block diagram of a processing device in a base station, as shown in FIG. 10. In FIG. 10, the processing device 1000 in the base station mainly includes a second transceiver 1001 and a first receiver 1002.

The second transceiver 1001 transmits a first signaling and a first radio signal.

The first receiver 1002 receives first information.

In Embodiment 10, only X1 bit(s) in a first bit block is(are) used for generating the first radio signal, the first bit block is obtained as an output of channel coding of a first code block, the first code block includes a positive integer number of bit(s), and the first bit block includes a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of a first terminal after channel decoding of the X1 bit(s) or a state of channel decoding of the first code block by a first terminal after channel decoding of the X1 bit(s); the first information is transmitted through an air interface; the X1 is a positive integer; and a receiver of the first radio signal includes the first terminal.

In one subembodiment, the second transceiver 1001 also transmits a second signaling; the second signaling includes a target threshold; the first terminal determines to transmit the first information according to a relationship between the state of buffer occupation and the target threshold, or the first terminal determines to transmit the first information according to a relationship between the state of channel decoding and the target threshold.

In one subembodiment, the second transceiver 1001 also transmits a third signaling; the third signaling is used for determining a first parameter of the base station, the first parameter is related to the target threshold; and the first parameter includes one of a type of the base station, a vertical distance between the base station and a ground surface, a range for a vertical distance between the base station and a ground surface or an RTT of the base station.

In one subembodiment, the second transceiver 1001 also receives second information; the second information is used for determining a capability of the first terminal, and the capability of the first terminal is related to the target threshold; and the second information is transmitted through an air interface.

In one subembodiment, the second transceiver 1001 also transmits a fourth signaling; the fourth signaling is used for indicating time-frequency resources occupied by the first radio signal, and a number of resource elements included in the time-frequency resources occupied by the first radio signal is used for determining a number of bits included in the first code block.

In one subembodiment, the second transceiver 1001 includes at least the former four of the receiver/transmitter 416, the transmitting processor 415, the receiving processor 412 an the controller/processor 440 illustrated in Embodiment 4.

In one subembodiment, the first receiver 1002 includes at least the former two of the receiver 416, the receiving processor 412 and the controller/processor 440 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the application includes but not limited to macro-cellular base stations, micro-cellular base stations, home base stations, relay base stations, gNBs, TRPs and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A User Equipment (UE) for wireless communication, comprising:
   a first transceiver, to receive a first signaling and a first radio signal; and
   a first transmitter, to transmit first information;
   wherein only X1 bit(s) in a first bit block is(are) used for generating the first radio signal, the first bit block is obtained as an output of channel coding of a first code block, the first code block comprises a positive integer number of bit(s), and the first bit block comprises a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE after channel decoding of the X1 bit(s) or a state of channel decoding of the first code block by the UE after channel decoding of the X1 bit(s); the first information is transmitted through an air interface; and the X1 is a positive integer;
   wherein when the first information is used for indicating a state of buffer occupation of the UE after channel decoding of the X1 bit(s), the state of buffer occupation is used for indicating a percentage of an occupied buffer size of the UE in a maximum buffer size of the UE, or the state of buffer occupation is used for indicating a percentage of an unoccupied buffer size of the UE in a maximum buffer size of the UE; when the first information is used for indicating a state of channel decoding of the first code block by the UE after channel decoding of the X1 bit(s), the UE also receives K radio signal(s) for the first code block before receiving the first radio signal, neither the K radio signal(s) nor the first radio signal is correctly received by the UE, the state of channel decoding of the first code block is used for determining that none of the (K+1) downlink transmissions of the first code block are correctly received, and the K is a positive integer.

2. The UE according to claim 1, wherein the first transceiver receives a second signaling; the second signaling comprises a target threshold; the UE determines to transmit the first information according to a relationship between the state of buffer occupation and the target threshold, or the UE determines to transmit the first information according to a relationship between the state of channel decoding and the target threshold.

3. The UE according to claim 2, wherein the first transceiver receives a third signaling; the third signaling is used for determining a first parameter of a first base station, the first parameter is related to the target threshold, and the first base station transmits the first radio signal; and the first parameter comprises one of a type of the first base station, a vertical distance between the first base station and a ground surface, a range for a vertical distance between the first base station and a ground surface or a Round Trip Time (RTT) of the base station.

4. The UE according to claim 2, wherein the first transceiver transmits second information; the second information is used for determining a capability of the UE, and the capability of the UE is related to the target threshold; and the second information is transmitted through an air interface.

5. The UE according to claim 1, wherein the first transceiver receives a fourth signaling; the fourth signaling is used for indicating time-frequency resources occupied by the first radio signal, and a number of resource elements comprised in the time-frequency resources occupied by the first radio signal is used for determining a number of bits comprised in the first code block.

6. A base station for wireless communication, comprising:
   a second transceiver, to transmit a first signaling and a first radio signal; and
   a first receiver, to receive first information;
   wherein only X1 bit(s) in a first bit block is(are) used for generating the first radio signal, the first bit block is obtained as an output of channel coding of a first code block, the first code block comprises a positive integer number of bit(s), and the first bit block comprises a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of a first terminal after channel decoding of the X1 bit(s) or a state of channel decoding of the first code block by the first terminal after channel decoding of the X1 bit(s); the first information is transmitted through an air interface; the X1 is a positive integer; and a receiver of the first radio signal comprises the first terminal;
   wherein when the first information is used for indicating a state of buffer occupation of the first terminal after channel decoding of the X1 bit(s), the state of buffer occupation is used for indicating a percentage of an occupied buffer size of the first terminal in a maximum buffer size of the first terminal, or the state of buffer occupation is used for indicating a percentage of an unoccupied buffer size of the first terminal in a maximum buffer size of the first terminal; when the first information is used for indicating a state of channel decoding of the first code block by the first terminal after channel decoding of the X1 bit(s), the first terminal also receives K radio signal(s) for the first code block before receiving the first radio signal, neither the K radio signal(s) nor the first radio signal is correctly received by the first terminal, the state of channel decoding of the first code block is used for determining that none of the (K+1) downlink transmissions of the first code block are correctly received, and the K is a positive integer.

7. The base station according to claim 6, wherein the second transceiver transmits a second signaling; the second signaling comprises a target threshold; the first terminal determines to transmit the first information according to a relationship between the state of buffer occupation and the target threshold, or the first terminal determines to transmit the first information according to a relationship between the state of channel decoding and the target threshold.

8. The base station according to claim 7, wherein the second transceiver transmits a third signaling; the third signaling is used for determining a first parameter of the base station, the first parameter is related to the target threshold; and the first parameter comprises one of a type of the base station, a vertical distance between the base station and a ground surface, a range for a vertical distance between the base station and a ground surface or a Round Trip Time (RTT) of the base station.

9. The base station according to claim 7, wherein the second transceiver receives second information; the second information is used for determining a capability of the first terminal, and the capability of the first terminal is related to the target threshold; and the second information is transmitted through an air interface.

10. The base station according to claim 6, wherein the second transceiver transmits a fourth signaling; the fourth signaling is used for indicating time-frequency resources occupied by the first radio signal, and a number of resource elements comprised in the time-frequency resources occupied by the first radio signal is used for determining a number of bits comprised in the first code block.

11. A method in a UE for wireless communication, comprising:
receiving a first signaling and a first radio signal; and
transmitting first information;
wherein only X1 bit(s) in a first bit block is(are) used for generating the first radio signal, the first bit block is obtained as an output of channel coding of a first code block, the first code block comprises a positive integer number of bit(s), and the first bit block comprises a positive integer number of bit(s); the first signaling is used for determining that the X1 bit(s) cannot be used for decoding of the first code block with combining when channel decoding for the X1 bit(s) fails; the first information is used for indicating at least one of a state of buffer occupation of the UE after channel decoding of the X1 bit(s) or a state of channel decoding of the first code block by the UE after channel decoding of the X1 bit(s); the first information is transmitted through an air interface; and the X1 is a positive integer;
wherein when the first information is used for indicating a state of buffer occupation of the UE after channel decoding of the X1 bit(s), the state of buffer occupation is used for indicating a percentage of an occupied buffer size of the UE in a maximum buffer size of the UE, or the state of buffer occupation is used for indicating a percentage of an unoccupied buffer size of the UE in a maximum buffer size of the UE; when the first information is used for indicating a state of channel decoding of the first code block by the UE after channel decoding of the X1 bit(s), the UE also receives K radio signal(s) for the first code block before receiving the first radio signal, neither the K radio signal(s) nor the first radio signal is correctly received by the UE, the state of channel decoding of the first code block is used for determining that none of the (K+1) downlink transmissions of the first code block are correctly received, and the K is a positive integer.

12. The method according to claim 11, comprising:
receiving a second signaling;
wherein the second signaling comprises a target threshold; the UE determines to transmit the first information according to a relationship between the state of buffer occupation and the target threshold, or the UE determines to transmit the first information according to a relationship between the state of channel decoding and the target threshold.

13. The method according to claim 12, comprising:
receiving a third signaling;
wherein the third signaling is used for determining a first parameter of a first base station, the first parameter is related to the target threshold, and the first base station transmits the first radio signal; and the first parameter comprises one of a type of the first base station, a vertical distance between the first base station and a ground surface, a range for a vertical distance between the first base station and a ground surface or a Round Trip Time (RTT) of the first base station.

14. The method according to claim 12, comprising:
transmitting second information;
wherein the second information is used for determining a capability of the UE, and the capability of the UE is related to the target threshold; and the second information is transmitted through an air interface.

15. The method according to claim 11, comprising:
receiving a fourth signaling;
wherein the fourth signaling is used for indicating time-frequency resources occupied by the first radio signal, and a number of resource elements comprised in the time-frequency resources occupied by the first radio signal is used for determining a number of bits comprised in the first code block.

* * * * *